(12) United States Patent
Kouda

(10) Patent No.: US 8,905,098 B2
(45) Date of Patent: Dec. 9, 2014

(54) PNEUMATIC TIRE

(75) Inventor: Hiraku Kouda, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 118 days.

(21) Appl. No.: 13/569,696

(22) Filed: Aug. 8, 2012

(65) Prior Publication Data

US 2013/0037192 A1 Feb. 14, 2013

(30) Foreign Application Priority Data

Aug. 10, 2011 (JP) ................................. 2011-174586

(51) Int. Cl.
*B60C 11/12* (2006.01)
*B60C 11/03* (2006.01)

(52) U.S. Cl.
CPC .......... *B60C 11/1272* (2013.04); *B60C 11/1259* (2013.04); *B60C 2011/0386* (2013.04); *B60C 2011/0388* (2013.04); *B60C 11/1204* (2013.04); *B60C 2011/039* (2013.04); *B60C 11/1222* (2013.04); *B60C 11/0306* (2013.04); *B60C 2011/1254* (2013.04); *B60C 2011/1227* (2013.04); *B60C 2011/129* (2013.04); *Y10S 152/03* (2013.01)
USPC ................................ 152/209.18; 152/DIG. 3

(58) Field of Classification Search
CPC ............ B60C 11/1204; B60C 11/1218; B60C 11/1222; B60C 11/1236; B60C 11/1259; B60C 11/1272; B60C 2011/1245; B60C 2011/1227; B60C 2011/1231; B60C 2011/1254
USPC ....................................... 152/209.18, DIG. 3
IPC ....................................................... B60C 11/12
See application file for complete search history.

(56) References Cited

U.S. PATENT DOCUMENTS

2005/0167022 A1 * 8/2005 Hashimoto .............. 152/209.25

FOREIGN PATENT DOCUMENTS

| DE | 19822573 C1 * | 10/1999 | .............. B60C 11/12 |
|----|---------------|---------|--------------------------|
| JP | 05-178028 | 7/1993 | |
| JP | 10029412 A * | 2/1998 | .............. B60C 11/12 |
| JP | 2000094909 A * | 4/2000 | .............. B60C 11/12 |
| JP | 2000255220 A * | 9/2000 | .............. B60C 11/12 |
| JP | 2007-216816 | 8/2007 | |
| JP | 2008-056206 | 3/2008 | |
| JP | 2008056206 A * | 3/2008 | .............. B60C 11/12 |

OTHER PUBLICATIONS

Machine Translation: JP2000-255220; Koya, M.; (no date).*
Machine Translation: DE19822573C1; Rodewald, Helmut; (no date).*
Machine Translation: JP 2008-056206; Kaneko; (no date).*
Machine Translation: JP 2000-094909; Hashimoto et al; (no date).*
Machine Translation: JP 10-029412; Azuma, Eiji; (no date).*

* cited by examiner

*Primary Examiner* — Justin Fischer
*Assistant Examiner* — Kendra Shin
(74) *Attorney, Agent, or Firm* — Thorpe North & Western LLP

(57) ABSTRACT

In a pneumatic tire including a tread portion, side wall portions, and bead portions, a plurality of drainage grooves formed from circumferential grooves or width direction grooves is provided in the tread portion. The drainage grooves partition land portions. A plurality of loop-shaped narrow grooves formed so that a pivot angle from a starting point to a terminating point is not less than 90° and less than 360° is concentrically disposed in the land portions. At least one end of the narrow grooves is open to a common drainage groove.

19 Claims, 4 Drawing Sheets

PNEUMATIC TIRE

PRIORITY CLAIM

Priority is claimed to Japan Patent Application Serial No. 2011-174586 filed on Aug. 10, 2011.

BACKGROUND

1. Technical Field

The present technology relates to a pneumatic tire in which a plurality of loop-shaped narrow grooves are concentrically disposed in a tread portion, and particularly relates to a pneumatic tire by which braking performance and turning performance on ice can be enhanced.

2. Related Art

Conventionally, many drainage grooves and/or sipes are provided in the tread portion of pneumatic tires that are expected to run on ice in order to increase performance on ice based on the edge effects of these drainage grooves and/or sipes. Specifically, the edge components in the tire width direction that resist slipping in the tire circumferential direction contribute to enhancing braking performance on ice, and the edge components in the tire circumferential direction that resist slipping in the tire width direction contribute to enhancing turning performance on ice.

In light of this understanding, providing loop-shaped sipes that (when viewed planarly) curve in circular, polygonal, or spiral-like manner in a tread portion has been proposed for the purpose of diversifying the extending direction of the edge components of the tread portion and enhancing braking performance and turning performance on ice (e.g. see Japanese Unexamined Patent Application Publication No. H05-178028A, Japanese Unexamined Patent Application Publication No. 2007-216816A, and Japanese Unexamined Patent Application Publication No. 2008-56206A).

However, with pneumatic tires provided with loop-shaped sipes in the tread portion, in cases when traveling on a road surface such as those where a water film is present on ice (when the air temperature is near 0° C.), water enters the sipes and, as a result, sufficient edge effects and water discharging effects of the sipes cannot be obtained. Particularly, sipes formed to have a loop-shape have few portions that are open to circumferential grooves and/or width direction grooves, and it is difficult to discharge water that was entered the sipes. Therefore, on roads such as those where a water film is present on ice, the expected functionality cannot be displayed. Thus, with the present technology, a definite enhancement of braking performance and turning performance on ice cannot be achieved.

SUMMARY

The present technology provides a pneumatic tire by which braking performance and turning performance on ice can be enhanced. A pneumatic tire of the present technology includes a tread portion extending in a tire circumferential direction to form an annular shape, a pair of side wall portions disposed on both sides of the tread portion, and a pair of bead portions disposed on inner sides in a tire radial direction of the side wall portions. In this pneumatic tire, a plurality of drainage grooves formed from circumferential grooves or width direction grooves is provided in the tread portion. The drainage grooves partition land portions. Moreover, a plurality of loop-shaped narrow grooves formed so that a pivot angle from a starting point to a terminating point is not less than 90° and less than 360° is concentrically disposed in the land portions. At least one end of the narrow grooves is open to a common drainage groove.

With the present technology, a plurality of loop-shaped narrow grooves is concentrically disposed in land portions of a tread portion. Therefore, the extending direction of the edge components of the narrow grooves can be diversified and braking performance and turning performance on ice can be enhanced. Moreover, the narrow grooves are formed so as to be loop-shaped, having a pivot angle from a starting point to a terminating point of not less than 90° and less than 360°, and at least one end of the narrow grooves is open to a common drainage groove. Therefore, water drainage efficiency of the narrow grooves can be increased, and superior braking performance and superior turning performance can be displayed, even on road surfaces such as those where a water film is present on ice (when the air temperature is near 0° C.).

In the present technology, the pivot angle of the narrow grooves is preferably not less than 120° and not more than 240°. As a result, it will be possible to dispose the narrow grooves that are formed in a loop-shape and are open to the drainage grooves more densely. Therefore, performance on ice can be further enhanced.

The narrow grooves preferably include a branched portion. By providing the narrow grooves with a branched portion, water in the narrow grooves can be more effectively discharged and performance on ice can be further enhanced.

A groove width of the narrow grooves is preferably configured to be from 0.3 mm to 2.0 mm. As a result, water drainage performance can be sufficiently ensured without decreasing the rigidity of the land portions significantly and excellent performance on ice can be displayed.

A groove depth of the narrow grooves is preferably configured to be not less than 2.0 mm and not more than a groove depth of the drainage grooves. As a result, water drainage performance can be sufficiently ensured without negatively affecting durability and excellent performance on ice can be displayed.

A spacing between the narrow grooves is preferably configured to be from 3.0 mm to 10 mm. Additionally, a total length per unit area of the narrow grooves is preferably configured to be from 0.05 mm/mm$^2$ to 0.5 mm/mm$^2$. As a result, water drainage performance can be sufficiently ensured without decreasing the rigidity of the land portions significantly and excellent performance on ice can be displayed.

While it is necessary that at least one end of the narrow grooves be open to the common drainage groove, preferably both ends of at least a portion of narrow grooves of the narrow grooves are open to the common drainage groove. As a result, water drainage performance can be sufficiently ensured and excellent performance on ice can be displayed.

Furthermore, preferably, a loop groove having a groove width greater than that of the narrow grooves is formed in the land portions along the narrow grooves, and both end portions of the loop groove are open to the common drainage groove. In cases where such a loop groove is disposed in combination with the narrow grooves, performance on ice can be further enhanced.

DETAILED DESCRIPTION

Figure 1:
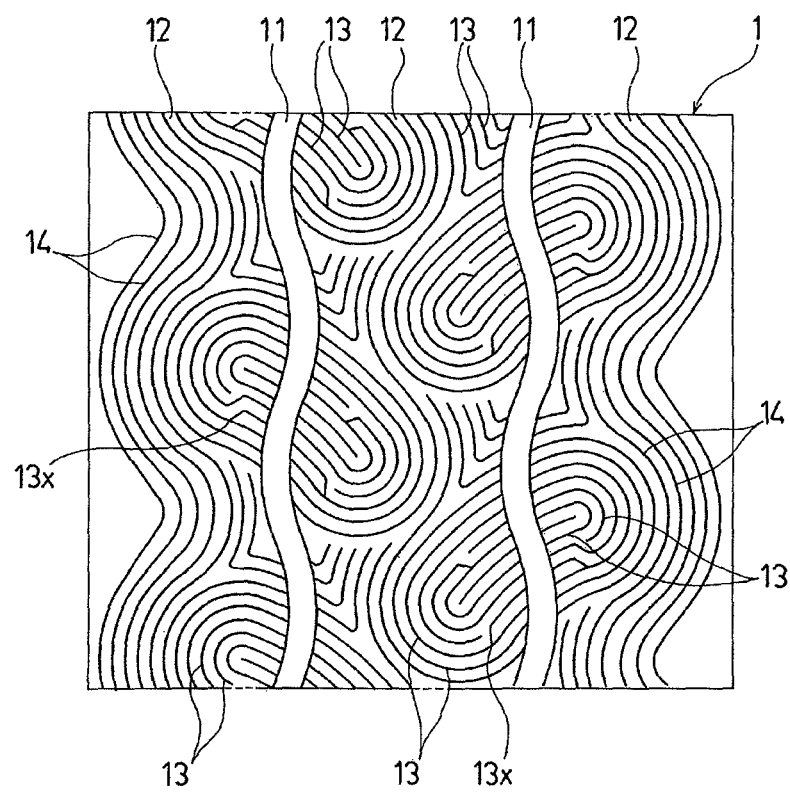
FIG. 1 is a development view illustrating a tread pattern of a pneumatic tire according to an embodiment of the present technology.
Figure 2:
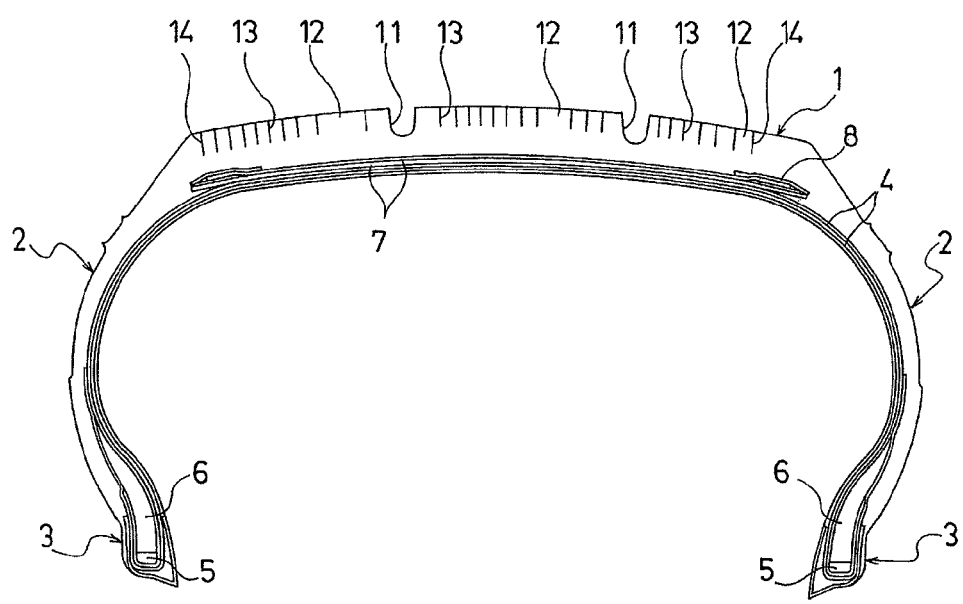
FIG. 2 is a meridian cross-sectional view illustrating the pneumatic tire according to the embodiment of the present technology.

Detailed descriptions will be given below of a configuration of the present technology with reference to the accompanying drawings. FIGS. 1 and 2 illustrate a pneumatic tire according to an embodiment of the present technology. As illustrated in FIGS. 1 and 2, a pneumatic tire of this embodiment is provided with a tread portion 1 extending in a tire circumferential direction to form an annular shape, a pair of side wall portions 2,2 that are disposed on both sides of the tread portion 1, and a pair of bead portions 3,3 that are disposed on inner sides in a tire radial direction of the side wall portions 2.

Two layers of a carcass layer 4 are mounted between the pair of bead portions 3,3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of layers of a belt layer 7 is embedded on an outer circumferential side of the carcass layer 4 in the tread portion 1. These belt layers 7 include a plurality of reinforcing cords that incline with respect to a tire circumferential direction and the reinforcing cords are disposed between the layers so as to intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 formed by arranging reinforcing cords at an angle of, for example, not more than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 1, two drainage grooves 11 extending while meandering in a tire circumferential direction are formed in a tread portion 1, and three rows of land portions 12 extending in the tire circumferential direction are partitioned by these drainage grooves 11. A groove width of the drainage grooves 11 is not less than 3.0 mm and is more preferably set in a range from 5.0 mm to 15.0 mm; a groove depth thereof is set in a range from 5.0 mm to 10.0 mm. Water drainage performance is sufficiently ensured by configuring the groove width of the drainage grooves 11 to be not less than 5.0 mm. Note that it is preferable that the drainage grooves 11 are circumferential grooves (as illustrated), but the drainage grooves 11 may also be width direction grooves extending in a tire width direction.

A plurality of loop-shaped narrow grooves 13 formed so that a pivot angle from a starting point to a terminating point is not less than 90° and less than 360° is concentrically disposed in each of the land portions 12. That is, one of the narrow grooves 13 is disposed as a center and the other narrow grooves 13 are disposed at a spacing therearound. Here, the "pivot angle of the narrow grooves 13" refers to an extent that the narrow grooves 13, which have a bent part or curving part, pivot, and is an angle defined by lines tangent at the starting point and the terminating point of the narrow grooves 13. For example, in cases where the lines tangent to the starting point and the terminating point of a narrow groove 13 that is bent into a "U" shape are parallel, the pivot angle thereof is 180°. Additionally, in cases where the narrow grooves 13 are curved so as to form a circle, the pivot angle thereof is 360°.

At least one end of the concentrically disposed narrow grooves 13 is open to a common drainage groove 11. Both ends of at least a portion of narrow grooves 13 of the narrow grooves 13 are open to the common drainage groove 11. Note that in this embodiment, all of the concentrically disposed narrow grooves 13 are open to the common drainage groove 11, but the narrow grooves 13 may be configured so that a portion of the concentrically disposed narrow grooves 13 is not open to the drainage grooves 11. However, in this case, preferably no less than 50% of the narrow grooves 13 of the concentrically disposed narrow grooves 13 are open to the drainage grooves 11.

Additionally, a plurality of narrow grooves 14 extending while meandering in the tire circumferential direction is formed in each of the land portions 12 positioned on shoulder sides. The narrow grooves 14 have the same dimensions as the narrow grooves 13, but are not open to the drainage grooves 11.

With the pneumatic tire described above, the plurality of loop-shaped narrow grooves 13 is concentrically disposed in the land portions 12 of the tread portion 1. Therefore, the extending direction of the edge components of the narrow grooves 13 can be diversified and braking performance and turning performance on ice can be enhanced. Moreover, the narrow grooves 13 are formed so as to be loop-shaped, having the pivot angle from the starting point to the terminating point of not less than 90° and less than 360°, and at least one end of the narrow grooves is open to the common drainage groove 11. Therefore, water drainage efficiency of the narrow grooves 13 can be increased. As a result, superior braking performance and superior turning performance can be displayed, even on road surfaces such as those where a water film is present on ice (when the air temperature is near 0° C.).

It is necessary that the pivot angle of the narrow grooves 13 be not less than 90° and less than 360°. If the pivot angle is greater than or equal to 360°, the narrow grooves 13 will interfere with each other. As a result, it will be difficult to dispose more of the narrow grooves 13 that are open to the drainage grooves 11 in a concentric manner. Additionally, if the pivot angle is less than 90°, dispersion in the extending direction of the edge components of the narrow grooves 13 will be insufficient. The pivot angle of the narrow grooves is preferably not less than 120° and not more than 240°. In this case, it will be possible to dispose the narrow grooves 13 that are formed in a loop-shape and are open to the drainage grooves 11 more densely, and performance on ice can be further enhanced.

In the pneumatic tire described above, a branched portion 13x is formed on a portion of the narrow grooves 13. That is, a portion of the narrow grooves 13 is branched midway and, preferably, is in communication with another of the narrow grooves 13. In cases where the narrow grooves 13 are provided with the branched portion 13x, water discharging efficiency of the narrow grooves 13 increases and performance on ice can be further enhanced.

A groove width of the narrow grooves 13 is set to be less than 5.0 mm, and is preferably set in a range from 0.3 mm to 2.0 mm. As a result, water drainage performance can be sufficiently ensured without decreasing the rigidity of the land portions 12 significantly and excellent performance on ice can be displayed. If the groove width of the narrow grooves 13 is less than 0.3 mm, water drainage performance will be insufficient and, on the other hand, if the groove width exceeds 2.0 mm, the effects of improving the water drainage performance will be eliminated due to a decline in the rigidity of the land portions 12, which will lead to the effect of improving the performance on ice being insufficient.

A groove depth of the narrow grooves 13 is preferably not less than 2.0 mm and less than or equal to a groove depth of the drainage grooves 11. As a result, water drainage performance can be sufficiently ensured without negatively affecting durability and excellent performance on ice can be displayed. If the groove depth of the narrow grooves 13 is less than 2.0 mm, water drainage performance will be insufficient. Additionally, if the groove depth of the narrow grooves 13 is greater than the groove depth of the drainage grooves 11, durability may decrease.

Spacing between the narrow grooves 13 is preferably set in a range from 3.0 mm to 10 mm. As a result, water drainage performance can be sufficiently ensured without decreasing the rigidity of the land portions 12 significantly and excellent performance on ice can be displayed. If the spacing between the narrow grooves 13 is less than 3.0 mm, the effects of improving the water drainage performance will be eliminated due to a decline in the rigidity of the land portions 12, which will lead to the effect of improving the performance on ice being insufficient, and, on the other hand, if the spacing between the narrow grooves 13 exceeds 10 mm, water drainage performance will be insufficient. Note that the "spacing between the narrow grooves 13" refers to a shortest distance between adjacent narrow grooves.

A total length per unit area of the narrow grooves 13 is preferably set in a range from 0.05 mm/mm$^2$ to 0.5 mm/mm$^2$. As a result, water drainage performance can be sufficiently ensured without decreasing the rigidity of the land portions 12 significantly and excellent performance on ice can be displayed. If the total length per unit area of the narrow grooves 13 is less than 0.05 mm/mm$^2$, water drainage performance will be insufficient and, on the other hand, if the total length per unit area of the narrow grooves 13 exceeds 0.5 mm/mm$^2$, the effects of improving the water drainage performance will be eliminated due to a decline in the rigidity of the land portions 12, which will lead to the effect of improving the performance on ice being insufficient.

Figure 3:
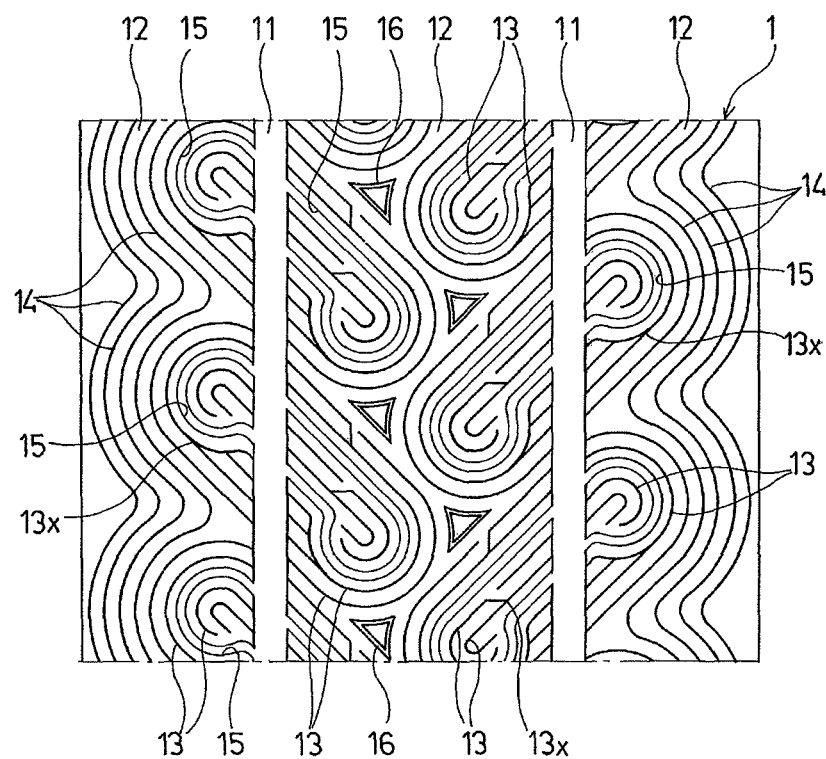
FIG. 3 is a development view illustrating a tread pattern of a pneumatic tire according to another embodiment of the present technology.

FIG. 3 illustrates a tread pattern of a pneumatic tire according to another embodiment of the present technology. As illustrated in FIG. 3, two drainage grooves 11 (circumferential grooves) extending straight in a tire circumferential direction are formed in a tread portion 1, and three rows of land portions 12 extending in the tire circumferential direction are partitioned by these drainage grooves 11. A plurality of loop-shaped narrow grooves 13 formed so that a pivot angle from a starting point to a terminating point is not less than 90° and less than 360° is concentrically disposed in each of the land portions 12. At least one end of the concentrically disposed narrow grooves 13 is open to a common drainage groove 11. Additionally, a branched portion 13x is formed on a portion of the narrow grooves 13.

In FIG. 3, a loop groove 15 having a groove width greater than that of the narrow grooves 13 is formed in the land portions 12 along the narrow grooves 13, and both end portions of the loop groove 15 are open to the common drainage groove 11 to which both end portions of the narrow grooves 13 are also open. A groove width of the loop groove 15 is set in a range from 3.0 mm to 10.0 mm, and a groove depth thereof is set in a range not less than 3.0 mm and shallower than the groove depth of the drainage grooves 11. The loop groove 15 described above includes multi-directional edge components like the narrow grooves 13, and both end portions thereof are in communication with the drainage grooves 11. Therefore, braking performance and turning performance on ice can be significantly enhanced by disposing the loop groove 15 in combination with the narrow grooves 13. Particularly, water can be made to flow easier from the loop groove 15 to the drainage grooves 11 by configuring the loop groove 15 to be shallower than the drainage grooves 11.

In FIG. 3, a plurality of narrow grooves 14 extending while meandering in the tire circumferential direction is formed in each of the land portions 12 positioned on the shoulder sides, and a plurality of narrow grooves 16 that form triangular shapes (when viewed planarly) is formed in the land portion 12 positioned at the tread center. The narrow grooves 16 reduce, as much as possible, regions where grooves do not exist and serve to further enhance performance on ice.

In each of the embodiments described above, at least one end of the concentrically disposed narrow grooves is configured to be open to a common circumferential groove extending in the tire circumferential direction. However, the narrow grooves may be configured so that at least one end thereof is open to a common width direction groove (e.g. a lug groove) extending in the tire width direction.

Additionally, in each of the embodiments described above, concentrically disposed narrow grooves are formed in a rib-like land portion extending in the tire circumferential direction, but it is also possible to form these concentrically disposed narrow grooves in block-like land portions that are divided by circumferential grooves and width direction grooves.

WORKING EXAMPLES

Tires for Working Examples 1 to 9 were fabricated having a common tire size of 205/55R16. Each of these tires included a tread portion extending in a tire circumferential direction to form an annular shape, a pair of side wall portions disposed on both sides of the tread portion, and a pair of bead portions disposed on inner sides in a tire radial direction of the side wall portions. As illustrated in FIG. 1, a plurality of drainage grooves formed from circumferential grooves was provided in the tread portion. The drainage grooves partitioned land portions. Moreover, a plurality of loop-shaped narrow grooves formed so that a pivot angle from a starting point to a terminating point is not less than 90° and less than 360° was concentrically disposed in the land portions. At least one end of the narrow grooves was open to a common drainage groove. The pivot angle, presence/absence of the branched portion, groove width, groove depth, spacing, and total length per unit area of the narrow grooves were varied as shown in Table 1.

Figure 4:
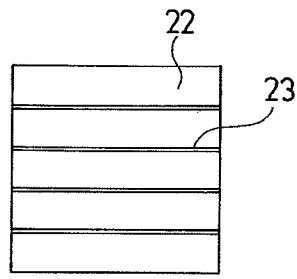
FIG. 4 is an enlarged plan view of main constituents illustrating narrow grooves formed in a tread portion of a pneumatic tire (Conventional Example 1).

For comparison, a tire for Conventional Example 1 was also prepared. In this tire, a plurality of drainage grooves formed from circumferential grooves was provided in a tread portion. The drainage grooves partitioned land portions. Moreover, as illustrated in the enlarged plan view of main constituents of FIG. 4, a plurality of narrow grooves (23)

extending in the tire width direction was provided in a land portion (22), and at least one end of these narrow grooves was configured to be open to the drainage grooves.

Figure 5:
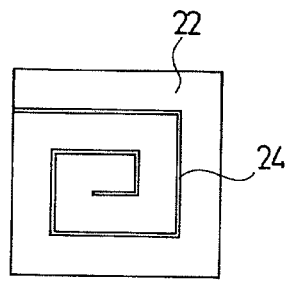
FIG. 5 is an enlarged plan view of main constituents illustrating narrow grooves formed in a tread portion of a pneumatic tire (Comparative Example 1).

Additionally, a tire for Comparative Example 1 was also prepared. In this tire, a plurality of drainage grooves formed from circumferential grooves was provided in a tread portion. The drainage grooves partitioned land portions. Moreover, as illustrated in the enlarged plan view of main constituents of FIG. 5, a plurality of narrow grooves (24) forming a spiral shape was provided in a land portion (22), and one end of these narrow grooves was configured to be open to the drainage grooves.

Figure 6:
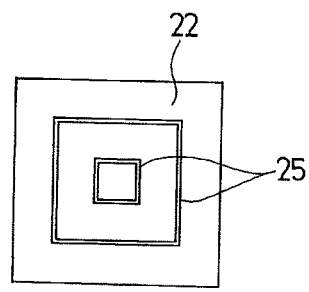
FIG. 6 is an enlarged plan view of main constituents illustrating narrow grooves formed in a tread portion of a pneumatic tire (Comparative Example 2).

Furthermore, a tire for Comparative Example 2 was also prepared. In this tire, a plurality of drainage grooves formed from circumferential grooves was provided in a tread portion. The drainage grooves partitioned land portions. Moreover, as illustrated in the enlarged plan view of main constituents of FIG. 6, a plurality of narrow grooves (25) forming an annular shape was concentrically disposed in a land portion (22).

In Conventional Example 1, Comparative Examples 1 and 2, and Working Examples 1 to 9, the groove width of the circumferential grooves was 8.0 mm and the groove depth thereof was 8.0 mm.

These test tires were evaluated for braking performance on ice and turning performance on ice according to the following evaluation methods. The results thereof are shown in Table 1.

Braking Performance on Ice

The test tires were assembled on wheels with a rim size of 16×6.5JJ, inflated to an air pressure of 210 kPa, and mounted on a test vehicle (front wheel drive vehicle) having an engine displacement of 2,000 cc. Braking distance was measured after braking from a state of driving at a speed of 100 km/h until the vehicle came to a stop on a test course with an icy road surface (ice temperature range: −5° C. to 0° C.). The evaluation results were indexed using the inverse of the measurement values, Conventional Example 1 being assigned an index value of 100. A larger index value indicates shorter braking distance and superior braking performance on ice.

Turning Performance on Ice

The test tires were assembled on wheels with a rim size of 16×6.5JJ, inflated to an air pressure of 210 kPa, and mounted on a test vehicle (front wheel drive vehicle) having an engine displacement of 2,000 cc. Time necessary to travel a certain interval when performing steady turning along a circle with a radius of 30 m on a test course with an icy road surface (ice temperature range: −5° C. to 0° C.) was measured. The evaluation results were indexed using the inverse of the measurement values, Conventional Example 1 being assigned an index value of 100. A larger index value indicates shorter travel time and superior turning performance on ice.

TABLE 1

|  | Conventional Example 1 | Comparative Example 1 | Comparative Example 2 | Working Example 1 | Working Example 2 | Working Example 3 |
|---|---|---|---|---|---|---|
| Pivot angle of the narrow grooves (°) | 0 | 540 | 360 | 90 | 180 | 180 |
| Disposal of the narrow grooves | Parallel | Spiral | Concentric | Concentric | Concentric | Concentric |
| Presence/absence of the branched portion | Absent | Absent | Absent | Absent | Absent | Present |
| Groove width of the narrow grooves (mm) | 1.0 | 1.0 | 1.0 | 1.0 | 1.0 | 1.0 |
| Groove depth of the narrow grooves (mm) | 6.0 | 6.0 | 6.0 | 6.0 | 6.0 | 6.0 |
| Spacing between the narrow grooves (mm) | 5.0 | 5.0 | 5.0 | 5.0 | 5.0 | 5.0 |
| Total length per unit area of the narrow grooves (mm/mm$^2$) | 0.4 | 0.4 | 0.4 | 0.4 | 0.4 | 0.4 |
| Braking performance on ice | 100 | 97 | 95 | 100 | 105 | 107 |
| Turning performance on ice | 100 | 105 | 103 | 105 | 105 | 107 |

|  | Working Example 4 | Working Example 5 | Working Example 6 | Working Example 7 | Working Example 8 | Working Example 9 |
|---|---|---|---|---|---|---|
| Pivot angle of the narrow grooves (°) | 180 | 180 | 180 | 180 | 180 | 180 |
| Disposal of the narrow grooves | Concentric | Concentric | Concentric | Concentric | Concentric | Concentric |
| Presence/absence of the branched portion | Present | Present | Present | Present | Present | Present |
| Groove width of the narrow grooves (mm) | 0.2 | 2.5 | 1.0 | 1.0 | 1.0 | 1.0 |
| Groove depth of the narrow grooves (mm) | 6.0 | 6.0 | 6.0 | 6.0 | 6.0 | 6.0 |

TABLE 1-continued

| | | | | | | |
|---|---|---|---|---|---|---|
| Spacing between the narrow grooves (mm) | 5.8 | 3.5 | 2.0 | 15.0 | 5.0 | 5.0 |
| Total length per unit area of the narrow grooves (mm/mm$^2$) | 0.3 | 0.5 | 0.7 | 0.1 | 0.03 | 1.0 |
| Braking performance on ice | 105 | 105 | 105 | 103 | 105 | 103 |
| Turning performance on ice | 105 | 105 | 105 | 103 | 105 | 103 |

As is clear from Table 1, compared with Conventional Example 1, with each of the tires of Working Examples 1 to 9, braking performance on ice and turning performance on ice were improved in a well-balanced manner. On the other hand, the tire of Comparative Example 1 had a plurality of narrow grooves forming a spiral shape in land portions of the tread portion, and water accumulated easily within the narrow grooves. Therefore, braking performance on ice decreased. The tire of Comparative Example 2 had a plurality of narrow grooves forming a compound-annular shape in land portions of the tread portion, and water accumulated easily within the narrow grooves. Therefore, braking performance on ice decreased.

What is claimed is:

1. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions; wherein
a plurality of drainage grooves formed from circumferential grooves is provided in the tread portion;
the drainage grooves partition rib-like land portions extending in the tire circumferential direction;
a plurality of loop-shaped narrow grooves formed so that a pivot angle from a starting point to a terminating point is not less than 90° and less than 360° is concentrically disposed in the land portions; and
at least one end of the narrow grooves is open to a common drainage groove formed from the circumferential groove.

2. The pneumatic tire according to claim 1, wherein the pivot angle of the narrow grooves is not less than 120° and not more than 240°.

3. The pneumatic tire according to claim 1, wherein the narrow grooves comprise a branched portion.

4. The pneumatic tire according to claim 3, wherein the branched portion is formed by at least one narrow groove including at least two curvatures curving in opposite directions.

5. The pneumatic tire according to claim 1, wherein a groove width of the narrow grooves is configured to be from 0.3 mm to 2.0 mm.

6. The pneumatic tire according to claim 1, wherein a groove depth of the narrow grooves is configured to be not less than 2.0 mm and not more than a groove depth of the drainage grooves.

7. The pneumatic tire according to claim 1, wherein a spacing between the narrow grooves is configured to be from 3.0 mm to 10 mm.

8. The pneumatic tire according to claim 1, wherein a total length per unit area of the narrow grooves is configured to be from 0.05 mm/mm$^2$ to 0.5 mm/mm$^2$.

9. The pneumatic tire according to claim 1, wherein both ends of at least a subset of the narrow grooves are open to the common drainage groove.

10. The pneumatic tire according to claim 1, wherein a loop groove having a groove width greater than that of the narrow grooves is formed in the land portions along the narrow grooves, and both end portions of the loop groove are open to the common drainage groove.

11. The pneumatic tire according to claim 1, wherein a groove width of the drainage grooves is not less than 3.0 mm.

12. The pneumatic tire according to claim 1, wherein a groove width of the drainage grooves is set in a range from 5.0 mm to 15.0 mm.

13. The pneumatic tire according to claim 1, wherein a groove depth of the drainage grooves is set in a range from 5.0 mm to 10.0 mm.

14. The pneumatic tire according to claim 1, wherein no less than 50% of the narrow grooves are open to the drainage grooves.

15. The pneumatic tire according to claim 1, wherein a portion of the narrow grooves is branched midway and is in communication with another of the narrow grooves.

16. The pneumatic tire according to claim 1, wherein a groove width of the narrow grooves is less than 5.0 mm.

17. The pneumatic tire according to claim 1, wherein a groove depth of the narrow grooves is configured to be not less than 2.0 mm.

18. The pneumatic tire according to claim 1, wherein a groove depth of the narrow grooves is configured to be not more than a groove depth of the drainage grooves.

19. The pneumatic tire according to claim 1, wherein a plurality of narrow grooves extending while meandering in the tire circumferential direction is formed in each of the land portions positioned on shoulder sides; and the narrow grooves are not open to the drainage grooves.

* * * * *